United States Patent
Karasawa

(10) Patent No.: US 6,878,928 B2
(45) Date of Patent: Apr. 12, 2005

(54) IMAGE RECORDING AND READ-OUT APPARATUS

(75) Inventor: Hiroyuki Karasawa, Fujisawa (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 233 days.

(21) Appl. No.: 09/988,373

(22) Filed: Nov. 19, 2001

(65) Prior Publication Data

US 2002/0060286 A1 May 23, 2002

(30) Foreign Application Priority Data

Nov. 22, 2000 (JP) ........................................ 2000-356289

(51) Int. Cl.⁷ ................................................. H01J 3/14
(52) U.S. Cl. ....................................... 250/235; 250/584
(58) Field of Search ................................ 250/584, 585, 250/234–236, 208.1, 581, 586, 588, 591; 347/229, 234, 235; 358/472–475; 369/47.15; 364/47.45

(56) References Cited

U.S. PATENT DOCUMENTS

| | | | | |
|---|---|---|---|---|
| 4,642,462 A | * | 2/1987 | Aagano et al. ............. 250/586 |
| 4,816,678 A | * | 3/1989 | Takasaki ..................... 250/586 |
| 4,859,849 A | * | 8/1989 | Shimura et al. ............ 250/582 |
| 4,908,511 A | * | 3/1990 | Ishikawa et al. ............ 250/235 |
| 4,959,545 A | * | 9/1990 | Arakawa et al. ............ 250/586 |
| 4,985,629 A | * | 1/1991 | Horikawa .................... 250/585 |
| 4,994,662 A | * | 2/1991 | Funahashi et al. ....... 250/208.1 |
| 5,051,588 A | * | 9/1991 | Agano ......................... 250/587 |
| 5,109,297 A | * | 4/1992 | Izumi .......................... 359/216 |
| 5,488,489 A | * | 1/1996 | Miyagawa ................... 358/474 |
| 5,654,556 A | * | 8/1997 | Yasuda ........................ 250/584 |
| 6,417,518 B2 | * | 7/2002 | Arakawa et al. ............ 250/587 |
| 6,515,270 B1 | * | 2/2003 | Isoda ...................... 250/208.1 |

* cited by examiner

Primary Examiner—Thanh X. Luu
(74) Attorney, Agent, or Firm—Sughrue Mion, PLLC

(57) ABSTRACT

In a image processing system, a cassette loading unit, a reciprocating feed system, an auxiliary scanning feed mechanism, and an erasing unit are controlled by a first CPU, and an image reading process and error processes relative to the reading of image information are performed by a second CPU. The image processing system starts a shading correcting process at a time when a first time has elapsed from a time when a start-of-scan signal is supplied, and ends the shading correcting process and detects an error and an erasing level at a time when a third time has elapsed from a time when an effecting reading period is ended.

36 Claims, 14 Drawing Sheets

IMAGE RECORDING AND READ-OUT APPARATUS

BACKGROUND OF THE INVENTION

1. Field of the Invention

The present invention relates to an image processing apparatus for reading an image on a sheet-like recording medium by applying a laser beam to the sheet-like recording medium and scanning the sheet-like recording medium with the laser beam in a main scanning direction.

2. Description of the Related Art

There is known a system for recording radiation image information of a subject such as a human body with a stimulable phosphor, and reproducing the recorded radiation image information on a photosensitive medium such as a photographic film, or displaying the recorded radiation image information on a display unit such as a CRT or the like.

The stimulable phosphor is a phosphor which, when exposed to an applied radiation (X-rays, α-rays, β-rays, γ-rays, electron beams, ultraviolet radiation, or the like), stores a part of the energy of the radiation, and, when subsequently exposed to applied stimulating rays such as visible light, emits light in proportion to the stored energy of the radiation. Usually, a sheet provided with a layer of the stimulable phosphor is used as a stimulable phosphor sheet for easy handling.

The above known system employs an image reading apparatus having a loading unit (loading device) for loading a cassette (container) which houses a stimulable phosphor sheet with radiation image information thereon, an image reading unit for reading the radiation image information carried by the stimulable phosphor sheet which has been removed from the cassette, and an erasing unit for erasing residual radiation image information on the stimulable phosphor sheet.

The above system also includes an image information reproducing apparatus for recording the radiation image information carried by the stimulable phosphor sheet and recording the read radiation image information on a photographic film (sheet-like recording medium). The image information reproducing apparatus has a loading unit (loading device) for loading a container such as a cassette or magazine which houses a photographic film, and a recording unit for recording the radiation image information on the photographic film.

The image reading unit has only one CPU for controlling the image reading unit itself, reading radiation image information, and performing various error processes as it does not have a CPU dedicated to the reading of radiation image information.

As a consequence, it is necessary to shorten a time required to detect and analyze an error with the single CPU. With the shortened time for error detection and analysis, the image reading unit is unable to perform complex error processes, and any messages produced when errors occur and actions made after errors are processed tend to be monotonous.

Actually, while each error that has occurred needs to be accompanied by an optimum error message and followed by an optimum subsequent action, the single CPU does not provide a sufficient time for such an optimum error message or subsequent action.

Another problem with the single CPU is that since it needs a dedicated counter for generating a synchronizing signal and a dedicated memory for shading correction, etc., the image reading unit is costly to manufacture.

SUMMARY OF THE INVENTION

It is therefore an object of the present invention to provide an image processing apparatus which can perform sophisticated error processes and can be manufactured at a reduced cost.

According to the present invention, there is provided an image processing apparatus having an image reading unit for reading an image per line from a sheet-like recording medium by applying a laser beam to the sheet-like recording medium and scanning the sheet-like recording medium with the laser beam in a main scanning direction, comprising: a controller dedicated for controlling reading of the image from the sheet-like recording medium, the controller being operable in synchronism with a main scanning synchronizing signal supplied thereto.

The process of reading the image and error processes relative to the reading of the image are performed by the dedicated controller. The image processing apparatus itself and error processes relative to the control of the image processing apparatus are controlled by another controller. These controllers are thus capable of securing a sufficient time for detecting and analyzing errors, and hence having a sufficient time for optimizing error messages or subsequent actions. Therefore, in the event of errors or failures, error messages can be outputted and subsequent actions can be taken depending on errors that have occurred, thus effectively performing sophisticated error processes and reducing the cost of manufacture of the image processing system.

The controller may comprise means for performing shading correction on the image to be read in at least an effective reading period in a period of reading one line of image.

The dedicated controller may comprise means for detecting at least an error in an ineffective reading period in a period of reading one line of image. The error-detecting means may include means for measuring the period of the main scanning synchronizing signal.

The image processing apparatus may further comprise an erasing unit for erasing image information carried on the sheet-like recording medium after the image is read therefrom, and the dedicated control may comprise means for detecting an erasing level for the erasing unit in an ineffective reading period in a period of reading one line of image. The erasing-level-detecting means may include means for holding a maximum value of the level of an image signal from the line to be read.

The shading-correction performing means may comprise means for outputting shading corrective data in synchronism with a reference clock signal, means for converting the outputted shading corrective data from digital data into an analog corrective signal, and means for adding an image signal representing the read image and the analog corrective signal to each other.

The shading-correction performing means may comprise means for converting an image signal representing the read image from analog image data into digital image data, means for reading shading corrective data in synchronism with a reference clock signal, means for adding the digital image data and the shading corrective data into combined data, and means for outputting the combined data.

The image processing apparatus may further comprise a deflector for deflecting the laser beam to scan the sheet-like recording medium in the main scanning direction while the laser beam is being applied to the sheet-like recording medium, the deflector having a plurality of facets, and the shading-correction performing means may perform shading correction depending on facet characteristics of each of the facets of the deflector.

The controller may comprise means for generating a signal to manage displaying of the image in synchronism with the main scanning synchronizing signal.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

An image processing apparatus according to the present invention as applied to an image processing system having an image reading apparatus and an image reproducing apparatus which employ a stimulable phosphor sheet, for example, will be described below with reference to FIGS. 1 through 14.

Figure 1:
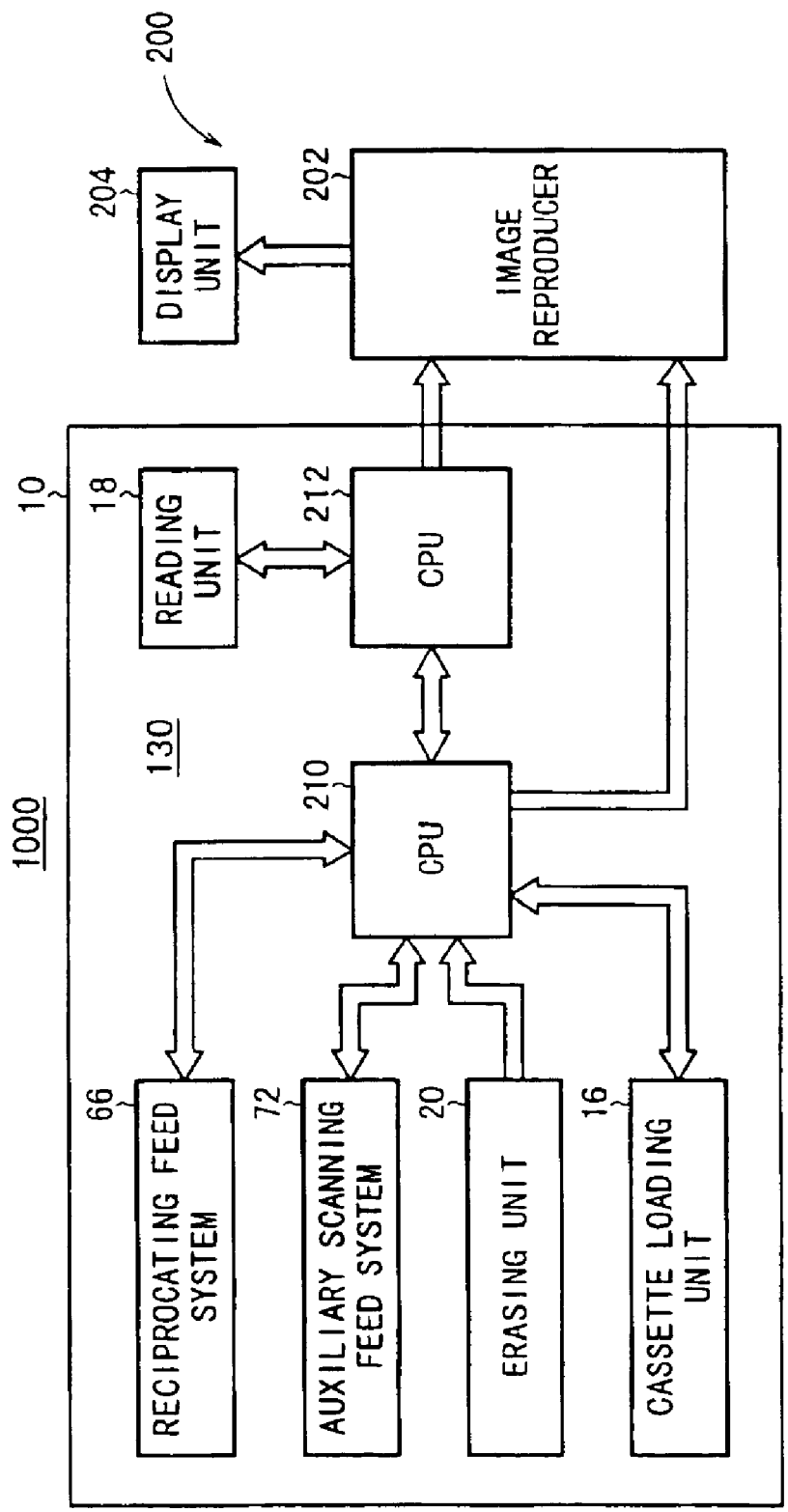
FIG. 1 is a block diagram of an image processing system as an image processing apparatus according to the present invention.

As shown in FIG. 1, an image processing system 1000 according to the present invention has an image reading apparatus 10 for reading an image and an image reproducing apparatus 200 for reproducing an image read by the image reading apparatus 10.

The image reproducing apparatus 200 has an image reproducer 202 comprising a personal computer and a display unit 204 comprising a liquid crystal display panel, a CRT, or the like.

Figure 2:
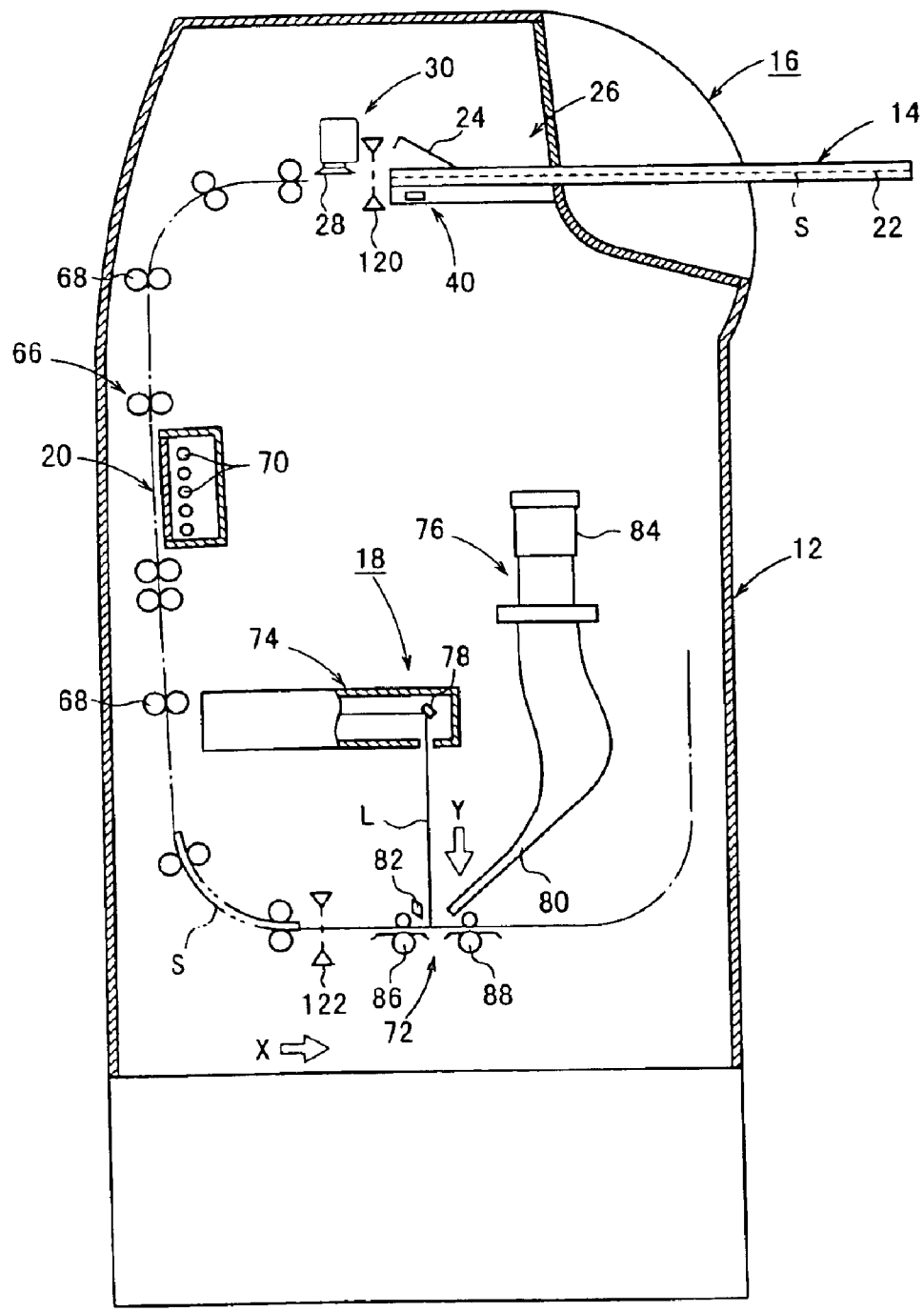
FIG. 2 is a vertical cross-sectional view of an image information reading apparatus incorporated in the image processing system.

As shown in FIG. 2, the image reading apparatus 10 is arranged to apply a laser beam L to a stimulable phosphor sheet S while scanning the stimulable phosphor sheet S with the laser beam L in a main scanning direction, collect light emitted from the stimulable phosphor sheet S, and photo-electrically read radiation image information, as represented by the emitted light, carried by the stimulable phosphor sheet S.

Specifically, the image reading apparatus 10 has an apparatus housing 12 which houses therein a cassette loading unit 16 for loading a cassette 14 which stores therein a stimulable phosphor sheet S as a sheet-like recording medium on which the radiation image information of a subject or the like is temporarily recorded, a reading unit 18 for applying a laser beam L as stimulating light to the stimulable phosphor sheet S to photoelectrically read the recorded radiation image information from the stimulable phosphor sheet S, and an erasing unit 20 for erasing residual radiation image information from the stimulable phosphor sheet S after the desired recorded radiation image information has been read from the stimulable phosphor sheet S.

The cassette 14 comprises a casing 22 for housing the stimulable phosphor sheet S therein, and a lid 24 openably and closably mounted on an end of the casing 22 for allowing the stimulable phosphor sheet S to be removed from and inserted into the casing 22.

The cassette loading unit 16 includes a cassette loading region 26 in which the cassette 14 is inserted horizontally, a lid opening/closing mechanism (not shown) for opening and closing the lid 24, and a sheet delivery means 30 having suction cups 28 for attracting and removing the stimulable phosphor sheet S from the cassette 14 and also returning the stimulable phosphor sheet S back into the cassette 14 after recorded image information has been read and residual image information has been erased.

As shown in FIG. 2, the erasing unit 20 and the reading unit 18 are positioned downstream of the sheet delivery mechanism 30 and connected thereto by a reciprocating feed system 66. The reciprocating feed system 66 comprises a plurality of roller pairs 68 that make up a vertical feed path extending from the cassette loading unit 16 and a horizontal feed path extending from the lower end of the vertical feed path. The erasing unit 20 is disposed on the vertical feed path. The reading unit 18 is disposed above the horizontal feed path. The erasing unit 20 has a vertical array of erasing light sources 70 which extend horizontally. The erasing unit 20 may have a single erasing light source, and the erasing light source or sources may extend vertically.

The reading unit 18 comprises an auxiliary scanning feed system 72 for feeding the stimulable phosphor sheet S in a horizontal auxiliary scanning direction indicated by the arrow X, a laser beam applying unit 74 for applying a laser beam L as scanning light substantially vertically downwardly as indicated by the arrow Y to the stimulable phosphor sheet S which is being fed in the auxiliary scanning direction to scan the stimulable phosphor sheet S in a main scanning direction perpendicular to the auxiliary scanning direction, and an image reading unit 76 for guiding light emitted from the stimulable phosphor sheet S upon exposure to the laser beam L and photoelectrically reading the radiation image information carried on the stimulable phosphor sheet S based on the emitted light.

The laser beam applying unit 74 has an optical system 78 for bending the laser beam L which has been emitted horizontally in a substantially vertically downward direction to apply the laser beam L to the stimulable phosphor sheet S. The reading unit 18 also includes a light guide 80 and a reflecting mirror 82 that are positioned near the area where the laser beam L is applied to the stimulable phosphor sheet S. The light guide 80 serves to collect and guide the light that is emitted from the stimulable phosphor sheet S upon exposure to the laser beam L. The image reading unit 76 also has a photomultiplier 84 mounted on the light guide 80. The auxiliary scanning feed system 72 has first and second roller pairs 86, 88 positioned beneath the light guide 80 and the reflecting mirror 82 and spaced horizontally in the direction indicated by the arrow X from each other by a certain distance.

Operation of the image reading apparatus 10 thus constructed will be described below.

The cassette 14 is horizontally loaded into the cassette loading region 26 that is positioned in an upper portion of the apparatus housing 12. The cassette 14 stores therein the stimulable phosphor sheet S with the radiation image information of a subject such as a human body being recorded thereon. The lid 24 of the loaded cassette 14 is opened by the lid opening/closing mechanism (not shown) in the cassette loading unit 16.

Then, the sheet delivery mechanism 30 is actuated to move the suction cups 28 into the cassette 14, and the suction cups 28 attract an upper surface of the stimulable phosphor sheet S in the cassette 14. The suction cups 28 which have attracted the stimulable phosphor sheet S are moved from within the cassette 14 toward the reciprocating feed system 66, thus removing the stimulable phosphor sheet S from the cassette 14. Substantially at the same time that the leading end of the stimulable phosphor sheet S removed from the cassette 14 is gripped by the first roller pair 68, the suction cups 28 release the stimulable phosphor sheet S.

The roller pairs 68 are rotated to feed the stimulable phosphor sheet S horizontally and then vertically downwardly along the vertical feed path of the reciprocating feed system 66. After the stimulable phosphor sheet S has passed through the erasing unit 20, the stimulable phosphor sheet S is fed along the horizontal feed path to the auxiliary scanning system 72 of the reading unit 18.

In the auxiliary scanning system 72, the stimulable phosphor sheet S is gripped by the first and second roller pairs 86, 88 and fed horizontally in the auxiliary scanning direction indicated by the arrow X. At the same time, the laser beam L is emitted from the laser beam applying unit 74. The laser beam L first travels horizontally and then is directed downwardly as indicated by the arrow Y by the optical system 78. The laser beam L is applied to the upper recording surface of the stimulable phosphor sheet S to scan the stimulable phosphor sheet S in the main scanning direction. In response to the application of the laser beam L, the upper recording surface of the stimulable phosphor sheet S emits light representing the recorded radiation image information. The emitted light is applied to the light guide 80 directly or by the reflecting mirror 82, and then guided by the light guide 80 to the photomultiplier 84, which photoelectrically reads the radiation image information based on the light.

After the radiation image information has been read from the stimulable phosphor sheet S, the auxiliary scanning feed system 72 is reversed to feed the stimulable phosphor sheet S upwardly along the reciprocating feed system 66 into the erasing unit 20. In the erasing unit 20, the erasing light sources 70 are energized to remove residual radiation image information from the stimulable phosphor sheet S. Thereafter, the stimulable phosphor sheet S is returned into the cassette 14, and the lid 24 is closed. The cassette 14 is unloaded from the loading region 26, and then the stimulable phosphor sheet S is processed to record next radiation image information.

Figure 3:
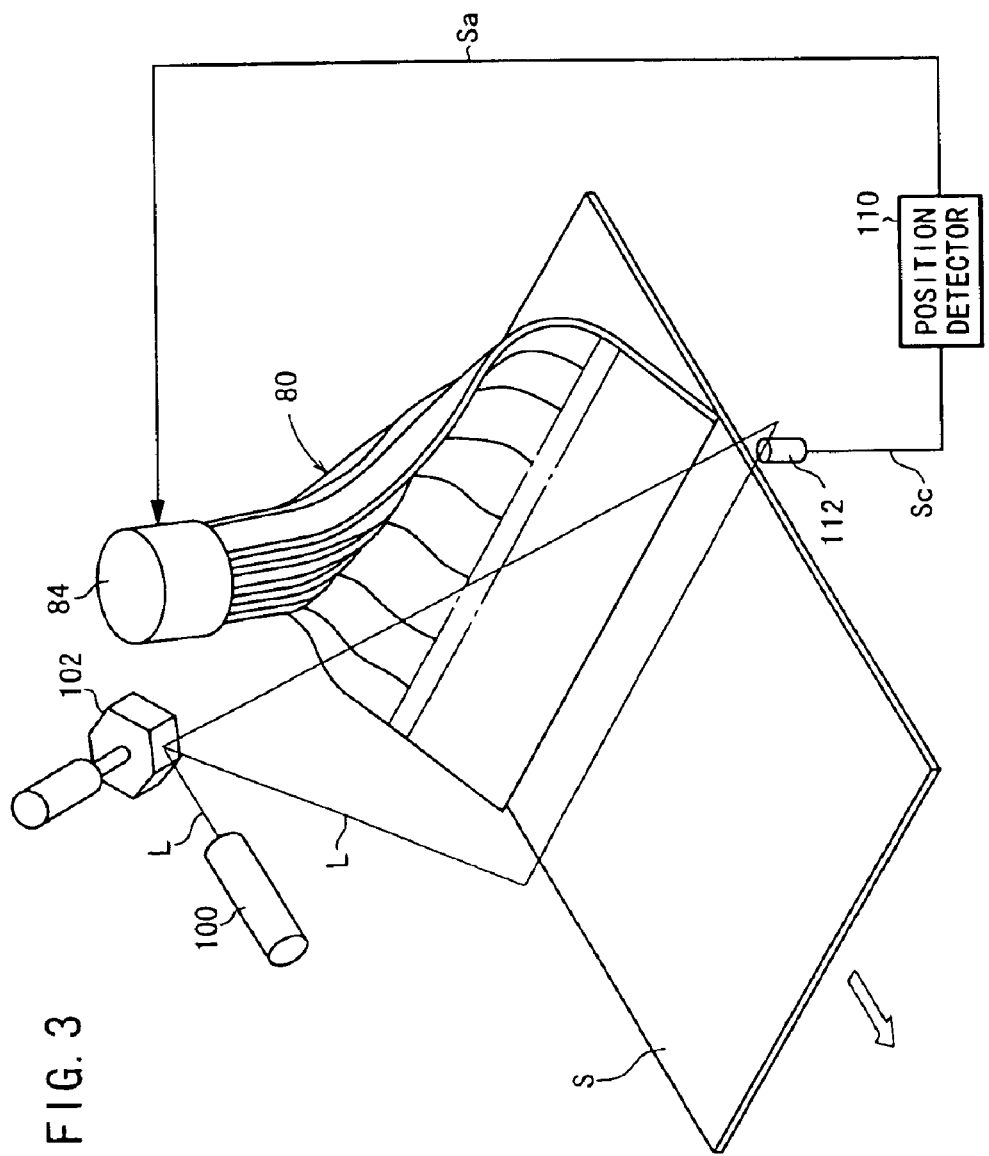
FIG. 3 is a perspective view of a reading unit in the image information reading apparatus.

The image reading process in the reading unit 18 will specifically be described below with reference to FIG. 3. The laser beam L emitted as stimulating light from a laser beam source 100 is applied to a polygon mirror 102, i.e., a rotor having six mirror facets, which reflects the laser beam L to the stimulable phosphor sheet S. The polygon mirror 102 is rotated to scan the stimulable phosphor sheet S with the laser beam L in the main scanning direction. The recording surface of the stimulable phosphor sheet S emits light from a line along which the stimulable phosphor sheet S is scanned with the laser beam L. The emitted light is applied to the photomultiplier 84, which photoelectrically reads an image of the scanned line on the stimulable phosphor sheet S.

As the stimulable phosphor sheet S is fed in the auxiliary scanning direction, the laser beam L scans the stimulable phosphor sheet S along successive lines thereon in the main scanning direction. In this manner, the photomultiplier 84 reads one frame of image carried on the stimulable phosphor sheet S.

The photomultiplier 84 starts reading each line of image in response to a start-of-scan signal Sa (main scanning synchronizing signal) from a position detector 110. The position detector 110 generates the start-of-scan signal Sa having a given pulse duration based on a detected signal Sc from a first sensor 112 which detects the laser beam L.

As shown in FIG. 2, the image reading apparatus 10 also has, in addition to the first sensor 112, a second sensor 120 and a third sensor 122. The second sensor 120 is disposed in the vicinity of the cassette loading region 26, and serves to detect when the cassette 14 is inserted into the cassette loading region 26, i.e., the apparatus housing 12. The third sensor 122 is positioned at a beginning end of the auxiliary scanning feed system 72, and serves to detect the arrival of the leading end of the stimulable phosphor sheet S.

A control system 130 of the image reading apparatus 10 will be described below with reference to FIGS. 1 and 4.

As shown in FIG. 1, the control system 130 has a first CPU 210 for controlling the cassette loading unit 16, the reciprocating feed system 66, the auxiliary scanning feed system 72, and the erasing unit 20, and a second CPU 212 for controlling the reading unit 18.

The first CPU 210 controls the control loading unit 16 to remove the stimulable phosphor sheet S from the cassette 14 when a signal indicative of the loading of the cassette 14 is supplied from the second sensor 120, and then controls the reciprocating feed system 66 to feed the removed stimulable phosphor sheet S toward the auxiliary scanning feed system 72.

The first CPU 210 controls the timing of nipping operation of the first and second roller pairs 86, 88 in response to a vertical synchronizing signal Sd (see FIG. 4) outputted from the second CPU 212. The first CPU 210 also processes image data outputted from the reading unit 18, and outputs the processed image data to an external device. After the recorded radiation image information is read from the stimulable phosphor sheet S, the first CPU 210 feeds the stimulable phosphor sheet S in the reverse direction based on the vertical synchronizing signal Sd from the second CPU 212.

At this time, the second CPU 212 transfers present erasing level data De to the first CPU 210. When the stimulable phosphor sheet S reaches the erasing unit 20, the first CPU 210 sends the present erasing level data De to the erasing unit 20. The erasing unit 20 applies an amount of light depending on the present erasing level data De to the stimulable phosphor sheet S for thereby erasing residual radiation image information from the stimulable phosphor sheet S.

After residual radiation image information is erased from the stimulable phosphor sheet S, the first CPU 210 controls the reciprocating feed system 66 to insert the stimulable phosphor sheet S back into the cassette 14.

Errors caused in the cassette loading unit 16, the reciprocating feed system 66, the auxiliary scanning feed system 72, and the erasing unit 20 are detected by an error detector 214 in the first CPU 210. Specifically, detected data and calculated data outputted from the various components of the image reading apparatus 10 are supplied to the error detector 214, which compares the supplied data with prescribed values and allowable ranges to detect errors. Error codes corresponding to the errors that have occurred are sent to the image reproducer 202 of the image reproducing apparatus 200 and converted by the image reproducer 202 into error messages, etc., which are displayed on the display unit 204.

The second CPU 212 comprises an erasing level detector 230, a shading corrector 232, an error detector 234, a horizontal synchronizing signal generator 236, and a vertical synchronizing signal generator 238. These components are software-implemented components which are read from a PROM (Programmable ROM) or a hard disk into a main memory, and executed by the second CPU 212.

To the second CPU 212, there are connected a peak holding circuit 240 for holding a peak level signal Sf, per line, from an image signal Sp outputted from the photomultiplier 84, a polygon controller 242 for rotating the polygon mirror 102 based on a polygon drive signal from the second CPU 212 and controlling the polygon mirror 102 based on a rotating state signal from the polygon mirror 102, the position detector 110, a pixel clock generator 244 for generating a pixel clock signal Pc in synchronism with the timing to output pixels based on the start-of-scan signal Sa from the position detector 110 and a horizontal synchronizing signal Se from the horizontal synchronizing signal generator 236, and a leading end detector 246 for outputting a leading end signal Sg based on the detected signal supplied from the third sensor 122.

To the second CPU 212, there are also connected a timer counter 248 and a memory 250 via a memory controller 252. The memory 250 stores information relative to at least shading correction, i.e., information composed of an array of corrective data. The memory controller 252 controls the memory 250 to successively output corrective data Di based on a readout instruction from the second CPU 212. The corrective data Di outputted from the memory 250 are converted into an analog corrective signal by a D/A converter (also shown as DAC) 254. The corrective data Di is read from the memory 250 at a high rate according to direct memory access.

The image signal Sp outputted from the photomultiplier 84 and the corrective signal outputted from the D/A converter 254 are combined (added) into a corrected signal by a combiner 256. The corrected signal outputted from the combiner 256 is converted by an A/D converter (also shown as ADC) 258 into digital image data Dp, which is outputted to the image reproducer 202.

Figure 5:
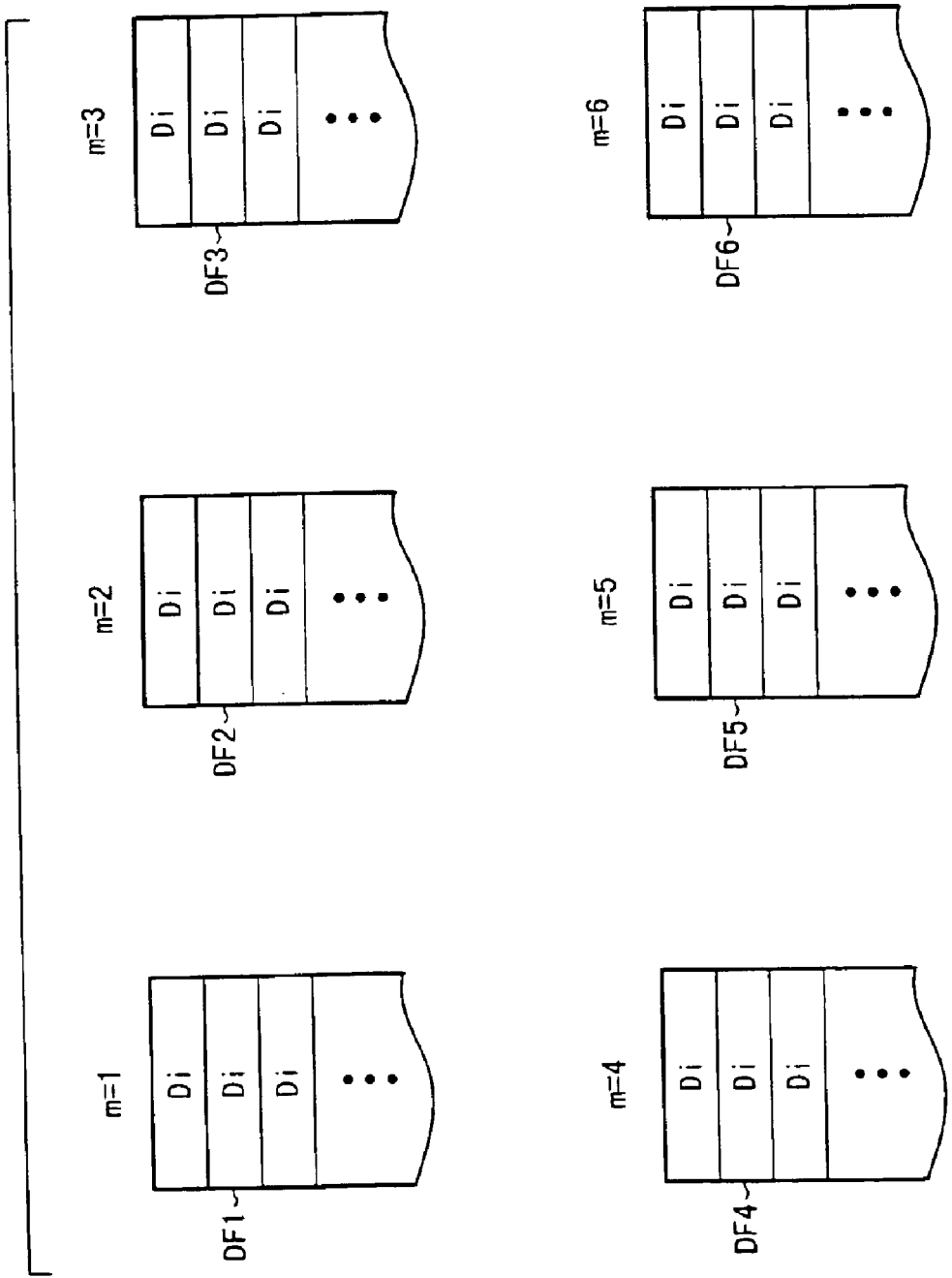
FIG. 5 is a diagram showing an array of data files used for shading correction.

As shown in FIG. 5, the information relative to shading correction includes as many data files DF1 through DF6 as the number of the facets of the polygon mirror 102. The data files DF1 through DF6 correspond to the respective facets of the polygon mirror 102. Each of these data files has records corresponding to a plurality of pixels, and each record stores corrective data Di for the corresponding pixel.

Each of the facets of the polygon mirror 102 does not have a flat surface, but a curved surface or a moderately concave/convex surface due to manufacturing irregularities. The curvature of the curved surface or the shape of the moderately concave/convex surface differs from facet to facet.

Figure 6:
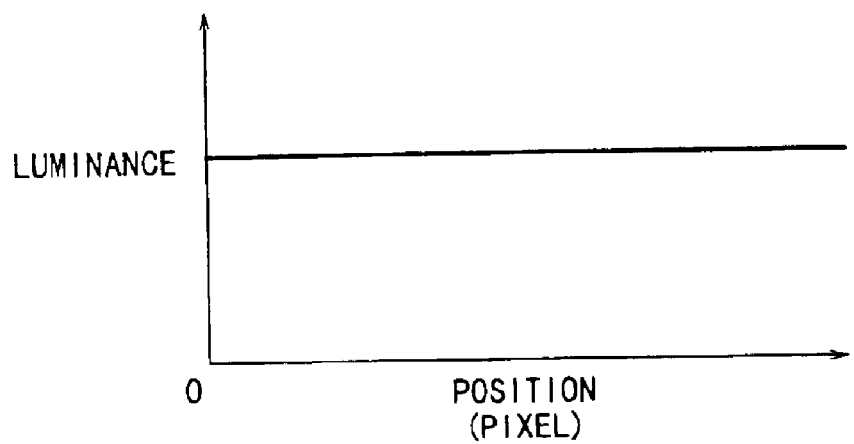
FIG. 6 is a diagram showing ideal luminance data characteristics per line at the time a uniformized image is read.

When a uniform image, such as a gray pattern, is read, if the facets of the polygon mirror 102 are flat, then the read image represents the same value (luminance data) over the entire range of pixels. For example, as shown in FIG. 6, when one line of image is read, the read image represents the same luminance data over the entire line.

Actually, however, since the facets of the polygon mirror 102 are irregular, the read image does not represent the same luminance data over the entire range of pixels, but represents luminance data depending on the surface characteristics of the facets of the polygon mirror 102. For example, as shown in FIG. 7, when one line of image is read, the read image represents luminance data that change according to the surface characteristics of the facets of the polygon mirror 102 in the range of pixels.

Figure 7:
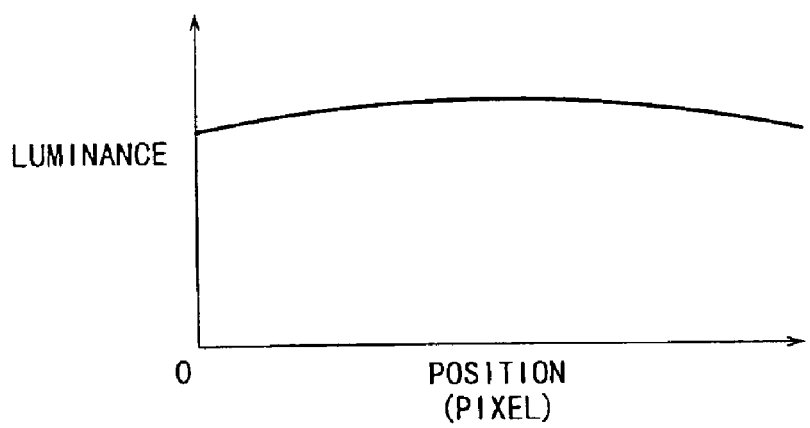
FIG. 7 is a diagram showing actual luminance data characteristics per line at the time a uniformized image is read.

If the image with the luminance data shown in FIG. 7 is reproduced as it is, then an area of the image which is to be displayed as a white area is actually displayed as a grayish area, and an area of the image which is to be displayed as a black area is actually displayed as a whitish area, resulting in a poor overall contrast level.

Figure 8:
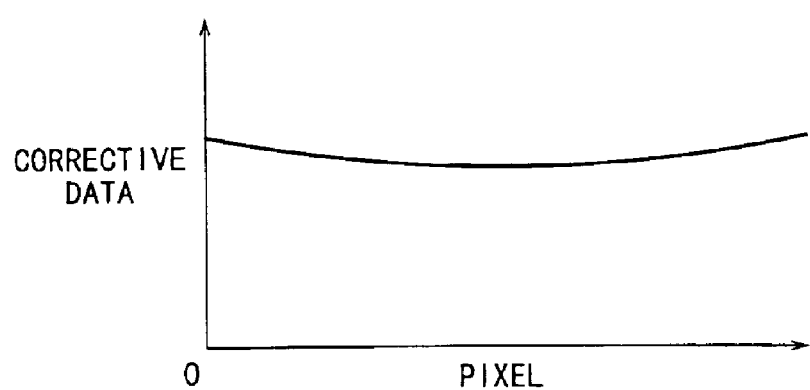
FIG. 8 is a diagram showing corrective data characteristics used for shading correction.

A shading correcting process is a process for adding, to the luminance data characteristics according to the surface characteristics of the facets of the polygon mirror 102, corrective data characteristics that represent a reversal of the luminance data characteristics, thereby to correct the luminance data characteristics to produce luminance data as if read by uniform polygon mirror facets. For example, if luminance data characteristics produced when one line of image is read are irregular as shown in FIG. 7, then corrective data characteristics capable of uniformizing the irregular luminance data characteristics are determined, as shown in FIG. 8, and registered in an array variable area of the memory 250. FIG. 5 shows, by way of example, corrective data Di arranged for the respective lines in the overall image reading area, divided for the facets of the polygon mirror 102, and registered in the form of data files. In FIGS. 6 through 8, the luminance data characteristics and the corrective data characteristics are indicated as envelopes passing through the values of luminance data obtained by reading one line of image.

The shading corrector 232 gives to the memory controller 252 the address of a data file based on the information of a line to be read and an index signal from the polygon controller 242, i.e., a signal generated by the polygon controller 242 each time the polygon mirror 102 makes one revolution. The memory controller 252 successively reads and outputs corrective data Di from the data file of the supplied address in timed relation to the pixel clock signal Pc from the pixel clock generator 244.

If residual radiation image information is erased from the stimulable phosphor sheet S at a maximum erasing level available in the erasing unit 20 at all times, then the erasing light sources 70 in the erasing unit 20 have a short service life and need to be replaced at short intervals. The frequent replacement of the erasing light sources 70 is tedious and time-consuming, and increases the running cost of the erasing unit 20. Actually, since it is only necessary to erase residual radiation image information having the highest luminance level of all the residual radiation image information, the highest luminance level of residual radiation image information is detected and used as an erasing level. Using such an erasing level makes it unnecessary for the erasing light sources 70 to apply a maximum level of erasing light at all times, so that the erasing light sources 70 have a relatively long service life and the running cost of the erasing unit 20 is relatively low.

In the present embodiment, the erasing level detector 230 detects a maximum peak level from the peak level signal Sf which is supplied from the peak holding circuit 240 per line of the image being read, and supplies the detected maximum peak level as erasing level data De to the first CPU 210.

Errors are detected by receiving detected values or calculated values from the rotating state of the polygon mirror 102 and the various sensors, and comparing them with prescribed values and allowable ranges. For example, the error detector 234 uses an error flag having a plurality of bits arranged according to the array of items to be detected for an error. The error detector 234 sets bits corresponding to those items which are recognized as including an error to "1", and generates or selects and outputs one or more error codes from the array of "1's" set in the error flag.

The error detector 234 is supplied with the horizontal synchronizing signal Se from the horizontal synchronizing signal generator 236. The error detector 234 measures the period of the supplied horizontal synchronizing signal Se, and outputs an error code if the measured period deviates from a prescribed range.

The one or more error codes outputted from the error detector 234 are supplied to the image reproducer 202 of the image reproducing apparatus 200. The image reproducer 202 converts the supplied one or more error codes into an error message or messages, which are displayed on the display unit 204. At this time, error codes may be transferred to the image reproducer 202 per line of image or error codes of all lines of image may be transferred to the image reproducer 202 after all the lines of image are read.

The timer counter 248 stores a suitable numerical value (count) supplied from the second CPU 212. From the time when the timer counter 248 stores the count, it decrements the stored numerical value based on a reference clock signal supplied from a clock generator (not shown). When the count is decremented to "0", the timer counter 248 outputs an interrupt signal to the second CPU 212.

The vertical synchronizing signal generator 238 generates the vertical synchronizing signal Sd based on the leading end signal Sg supplied from the leading end detector 246. The vertical synchronizing signal Sd is supplied to the horizontal synchronizing signal generator 236, the first CPU 210, and the image reproducer 202.

The horizontal synchronizing signal generator 236 generates the horizontal synchronizing signal Se which goes low in level, for example, in the effective reading period of one line based on the start-of-scan signal Sa supplied from the position detector 110. The horizontal synchronizing signal Se is supplied to the erasing level detector 230, the shading corrector 232, the error detector 234, the pixel clock generator 244, and the image reproducer 202.

Operation of the second CPU 212 will be described below with reference to FIG. 9, which shows a main routine of a processing sequence of the second CPU 212.

Figure 9:
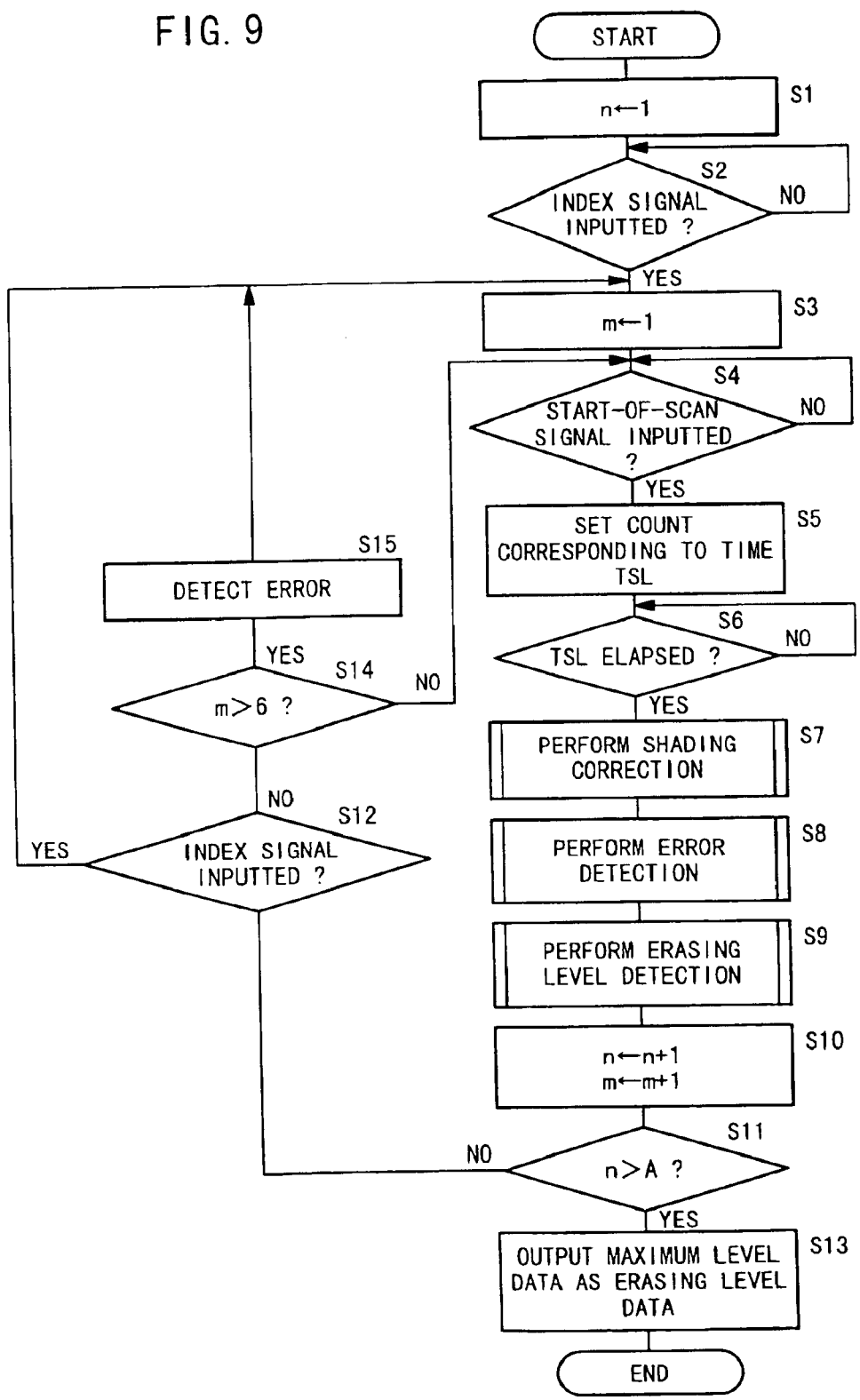
FIG. 9 is a flowchart of a processing sequence performed by a second CPU.

In step S1 shown in FIG. 9, the second CPU 212 stores an initial value "1" in an index register n that is used to update lines, thus initializing the index register n.

In step S2, the second CPU 212 determines whether there is an index signal supplied from the polygon controller 242 or not. If there is an index signal supplied from the polygon controller 242, then control goes to step S3 in which the second CPU 212 stores an initial value "1" in an index register m that represents a present polygon mirror facet, thus initializing the index register m.

In step S4, the second CPU 212 determines whether there is a start-of-scan signal Sa supplied from the position detector 110 or not. If there is a start-of-scan signal Sa supplied from the position detector 110, then control goes to step S5 in which the second CPU 212 stores a count corresponding to a first time TSL (see FIG. 13C) in the timer counter 248. From the time when the count is stored, the timer counter 248 decrements the stored count based on the reference clock signal. When the count is decremented to "0", the timer counter 248 outputs an interrupt signal to the second CPU 212.

In step S6, the second CPU 212 determines whether the first time TSL has elapsed or not based on whether the interrupt signal is supplied from the timer counter 248 or not. If the first time TSL has elapsed, control goes to step S7 in which the shading corrector 232 performs its processing sequence.

Figure 10:
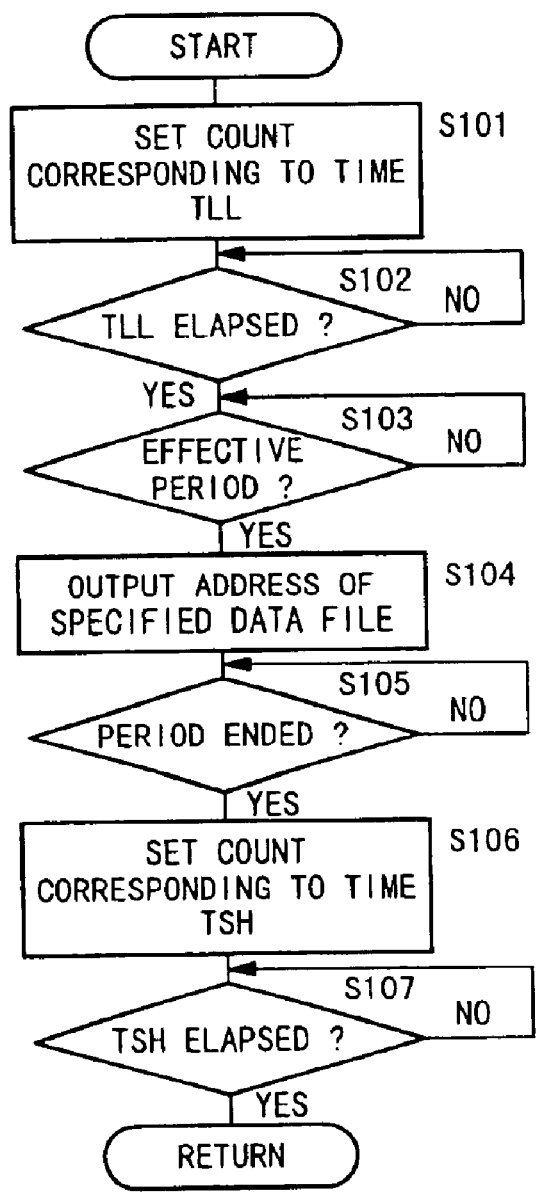
FIG. 10 is a flowchart of a processing sequence performed by a shading corrector.
Figure 11:
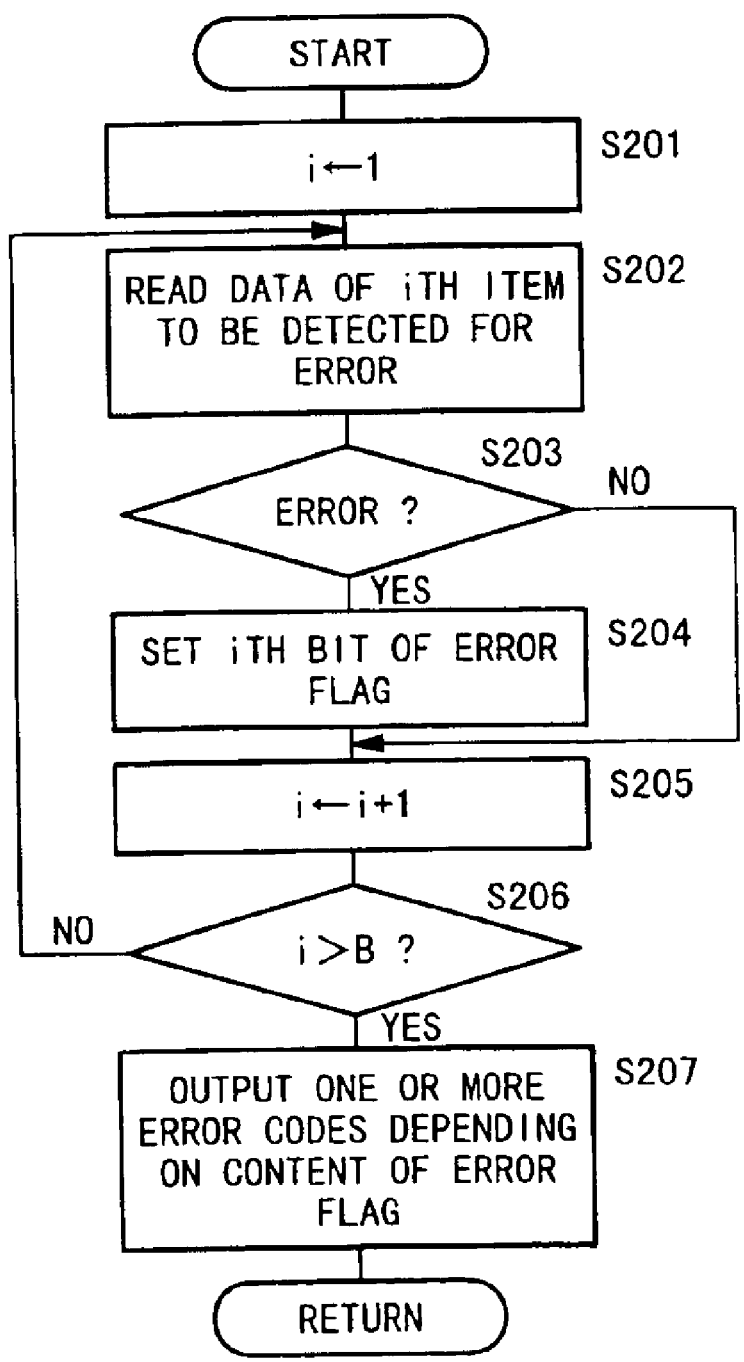
FIG. 11 is a flowchart of a processing sequence performed by an error detector.
Figure 12:
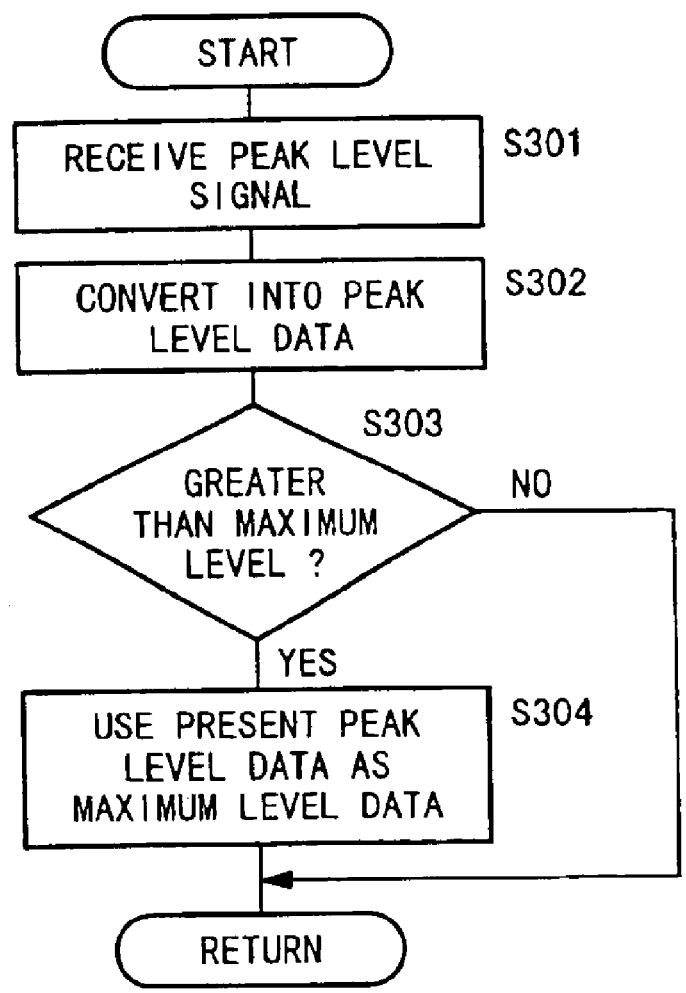
FIG. 12 is a flowchart of a processing sequence performed by an erasing level detector.
Figure 13:
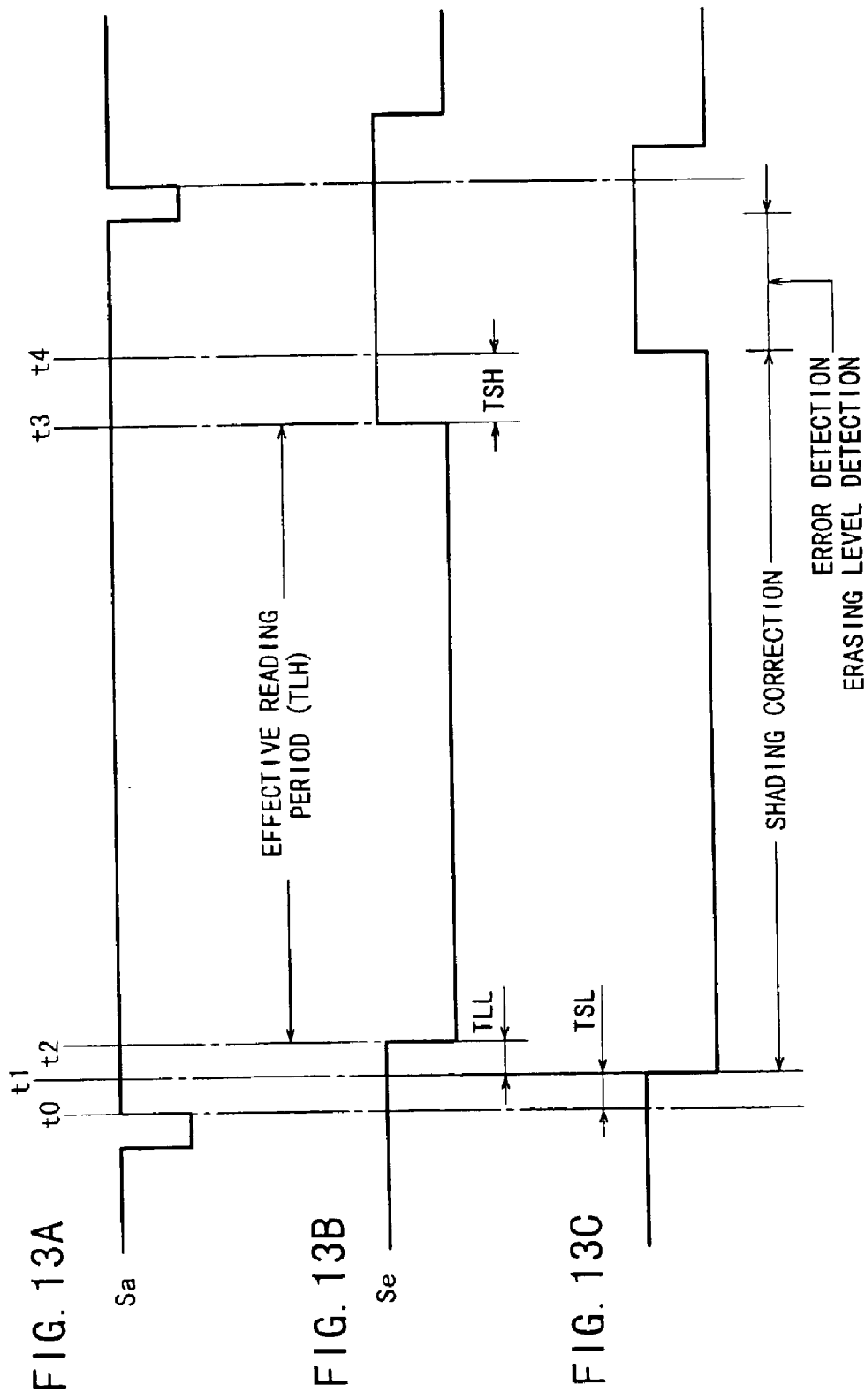
FIG. 13A is a waveform diagram showing a start-of-scan signal.
FIG. 13B is a waveform diagram showing a horizontal synchronizing signal.
FIG. 13C is a timing chart showing the timing of a shading correcting process, an error detecting process, and an erasing level detecting process.

The processing sequence of the shading corrector 232 will be described below with reference to FIG. 10. In step S101, the shading corrector 232 stores a count corresponding to a second time TLL (see FIG. 13B) in the timer counter 248. In step S102, the shading corrector 232 determines whether the second time TLL has elapsed or not based on whether an interrupt signal is supplied from the timer counter 248 or not. If the second time TLL has elapsed, then control goes to step S103 in which the shading corrector 232 determines whether the present time is in an effective reading period TLH (see FIG. 13B) or not based on whether the supplied horizontal synchronizing signal Se goes low in level or not.

If the effective reading period TLH has started, then control goes to step S104 in which the shading corrector 232 specifies a data file corresponding to the present line, i.e., an mth data file, and outputs the address of the mth data file to the memory controller 252.

Then, in step S105, the shading corrector 232 determines whether the effective reading period TLH has elapsed or not based on whether the supplied horizontal synchronizing signal Se goes high in level or not.

During the effective reading period TLH, the memory controller 252 successively reads and outputs corrective data Di from the data file of the supplied address, among the data files stored in the memory 250, in timed relation to the pixel clock signal Pc from the pixel clock generator 244.

The outputted corrective data Di are converted into a corrective signal by the D/A converter 254, and the corrective signal is combined with, i.e., added to, the image signal Sp of the pixels of the nth line by the combiner 256, thus correcting the image signal Sp. The corrected image signal Sp is converted by the A/D converter 258 into digital image data Dp, which are supplied to the image reproducer 202.

In step S106, the shading corrector 232 stores a count corresponding to a third time TSH (see FIGS. 13B and 13C) in the timer counter 248. In step S107, the shading corrector 232 determines whether the third time TSH has elapsed or not based on whether there is an interrupt signal supplied from the timer counter 248 or not. If the third time TSH has elapsed, then the processing sequence of the shading corrector 232 is put to an end.

Referring back to the main routine shown in FIG. 9, the error detector 234 performs its processing sequence in step S8. The processing sequence of the error detector 234 will be described below with reference to FIG. 11. In step S201, the error detector 234 stores an initial value "1" in an index register i that is used to search for errors, thus initializing the index register i.

In step S202, the error detector 234 reads data or a value of an ith item to be detected for an error. Specifically, the error detector 234 reads data or a value of the ith item, among the detected data or calculated values from the various sensors.

In step S203, the error detector 234 determines whether the read data or value represents an error or not by comparing the read data or value with a prescribed value or an allowable range for the ith item and determining whether the read data or value deviates from the prescribed value or the allowable range for the ith item or not. The items to be detected for an error include the period of the horizontal synchronizing signal Se. If the period of the horizontal synchronizing signal Se deviates from a prescribed range, then it is recognized as including an error.

If the read data or value represents an error, then control goes to step S204 in which the error detector 234 sets an ith bit of the error flag to "1". In step S205, the error detector 234 increments the value of the index register i by "1". Then, in step S206, the error detector 234 determines whether all items to be detected for an error have been processed or not based on whether the value of the index register i is greater than the number B of items to be detected for an error or not.

If not all items to be detected for an error have been processed, then control goes back to step S202 in which the error detector 234 processes a next item to be detected for an error. If all items to be detected for an error have been processed, then control proceeds to step S207 in which the error detector 234 generates or selects and outputs one or more error codes from the array of "1's" set in the error flag. The one or more error codes outputted from the error detector 234 are supplied to the image reproducer 202. The image reproducer 202 converts the supplied one or more error codes into an error message or messages, which are displayed on the display unit 204. In the subroutine shown in FIG. 11, error information is transferred to the image reproducer 202 per line of image. However, error information of all lines of image may be accumulated, and may be transferred to the image reproducer 202 after all the lines of image are read.

Referring back to the main routine shown in FIG. 9, the erasing level detector 230 performs its processing sequence in step S9. The processing sequence of the erasing level detector 230 will be described below with reference to FIG. 12. In step S301 shown in FIG. 12, the erasing level detector 230 receives the peak level signal Sf relative to the present line from the peak holding circuit 240.

In step S302, the erasing level detector 230 converts the peak level signal Sf into digital peak level data as present peak level data. In step S303, the erasing level detector 230 determines whether the value of the present peak level data is greater than the value of the maximum level data that is currently held or not.

If the value of the present peak level data is greater than the value of the maximum level data, then control goes to step S304 in which the erasing level detector 230 uses the present peak level data as the maximum level data.

After step S304 or if the value of the present peak level data is equal to or smaller than the value of the maximum level data in step S303, then the processing sequence of the erasing level detector 230 is put to an end.

Referring back to the main routine shown in FIG. 9, the second CPU 212 increments each of the values of the index registers n, m by "1" in step S10. Then, in step S11, the second CPU 212 determines whether the processing has been finished for all lines or not based on whether the value of the index register n is greater than the maximum number A of lines or not.

If the processing has not been finished for all lines, then control goes to step S12 in which the second CPU 212 determines whether there is an index signal supplied from the polygon controller 242 or not. If there is an index signal supplied from the polygon controller 242, then control goes back to step S3 and repeats the processing from step S3.

If there is no index signal supplied from the polygon controller 242, then control goes to step S14 in which the second CPU 212 determines the processing has been finished for the sixth polygon mirror facet or not based on whether the value of the index register m is greater than "6" or not.

If the processing has not been finished for the sixth polygon mirror facet, then control goes back to step S4 and repeats the processing from step S4. If the processing has been finished for the sixth polygon mirror facet, then the second CPU 212 performs a process of detecting an error relative to the polygon mirror 102 in step S15, after which control goes back to step S3 and repeats the processing from step S3.

If the processing has been finished for all lines in step S11, then control proceeds to step S13 in which the erasing level detector 230 transfers the maximum level data being held thereby as erasing level data De to the first CPU 210.

When the processing in step S13 is over, the process of reading radiation image information from one stimulable phosphor sheet S is ended.

In the image processing system 1000, as described above, the cassette loading unit 16, the reciprocating feed system 66, the auxiliary scanning feed system 72, and the erasing unit 20 are controlled by the first CPU 210, and the image reading process and the error processes relative to the reading of radiation image information are performed by the second CPU 212.

The image processing system 1000 thus constructed makes it possible to start the shading correcting process at a time t1 (earlier than a time t2 to start the effecting reading period TLH by the second time TLL) when the first time TSL has elapsed from a time t0, and makes it possible to end the shading correcting process and detect an error and an erasing level at a time t4 when the third time TSH has elapsed from a time t3 when the effecting reading period TLH is ended.

The CPUs 210, 212 are thus capable of securing a sufficient time for detecting and analyzing errors, and hence having a sufficient time for optimizing error messages or subsequent actions. Therefore, in the event of errors or failures, error messages can be outputted and subsequent actions can be taken depending on errors that have occurred, thus effectively performing sophisticated error processes and reducing the cost of manufacture of the image processing system.

Figure 14:
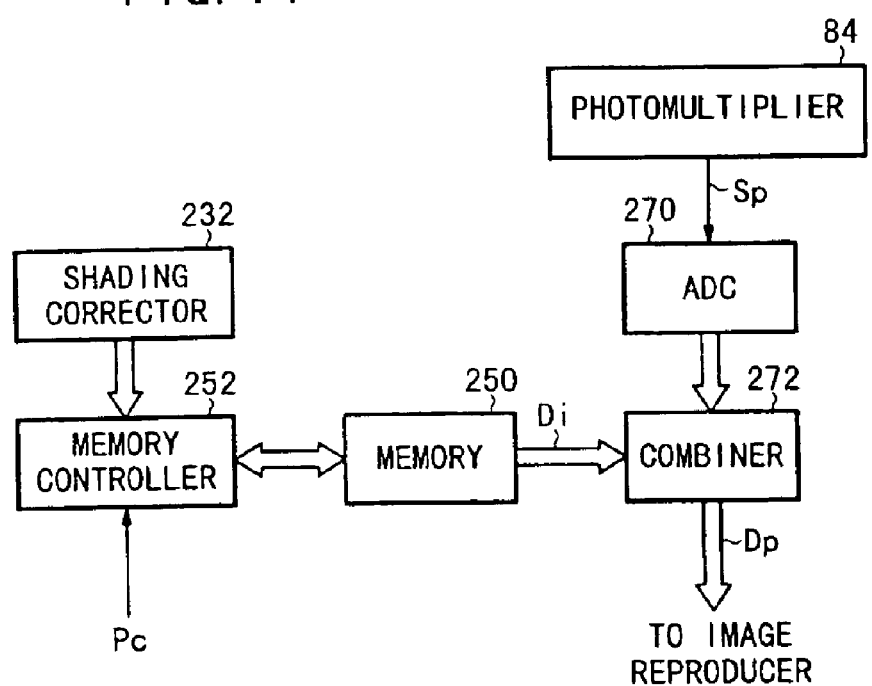
FIG. 14 is a block diagram showing another shading correcting process.

In the above embodiment, the corrective data Di read from the memory 250 are converted into an analog corrective signal, which is then combined with the image signal Sp thereby to correct the image signal Sp, and then the corrected image signal Sp is converted into digital image data Dp. However, as shown in FIG. 14, an A/D converter (also shown as ADC) 270 for converting the image signal Sp into digital image data may be connected to the output of the photomultiplier 84, and the corrective data Di read from the memory 250 may be directly added to the image data by a combiner 272, thus producing corrected image data Dp, which may be outputted to the image reproducer 202. According to the modification shown in FIG. 14, since the D/A converter 254 shown in FIG. 4 is dispensed with, the overall circuit arrangement may be simplified. The function of the combiner 272 can be implemented by software in the second CPU 212.

Figure 4:
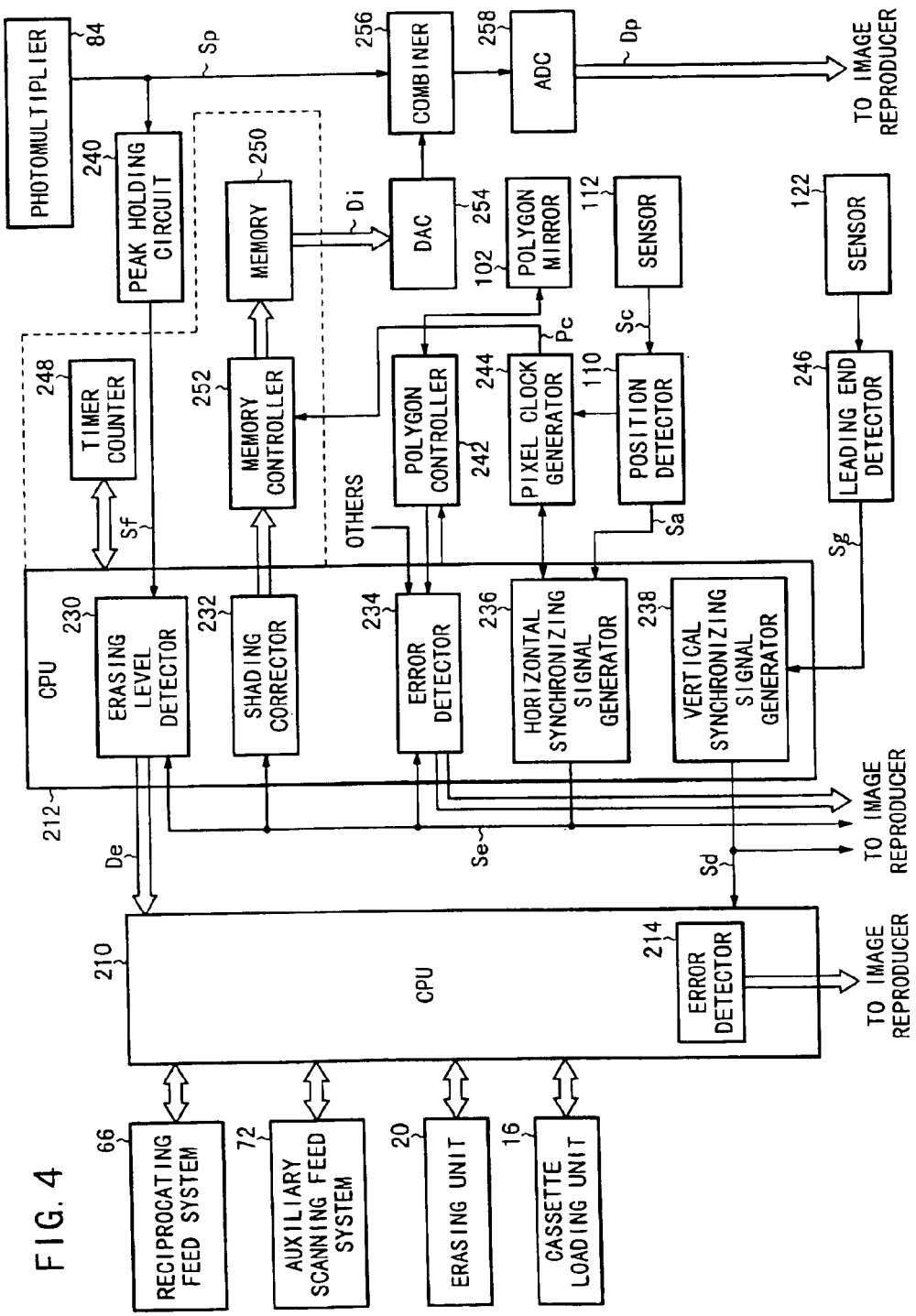
FIG. 4 is a block diagram of a control system of the image information reading apparatus.

As indicated by the broken lines in FIG. 4, the second CPU 212 may be constructed as a CPU including the timer counter 248, the memory 250, and the memory controller 252.

Although certain preferred embodiments of the present invention have been shown and described in detail, it should be understood that various changes and modifications may be made therein without departing from the scope of the appended claims.

What is claimed is:

1. An image processing apparatus having an image reading unit for reading an image per line from a sheet-like recording medium by applying a laser beam to the sheet-like recording medium and scanning the sheet-like recording medium with the laser beam in a main scanning direction, comprising:
   a controller dedicated for controlling reading of the image from the sheet-like recording medium, said controller being operable in synchronism with a main scanning synchronizing signal supplied thereto;
   an erasing unit for erasing image information carried on said sheet-like recording medium after said image is read therefrom; and wherein
   a period of scanning one line of image comprises an effective reading period and an ineffective reading period, and said controller comprises means for detecting an erasing level in said ineffective reading period.

2. An image processing apparatus having an image reading unit for reading an image per line from a sheet-like recording medium by applying a laser beam to the sheet-like recording medium and scanning the sheet-like recording medium with the laser beam in a main scanning direction, comprising:
   a controller dedicated for controlling reading of the image from the sheet-like recording medium, said controller being operable in synchronism with a main scanning synchronizing signal supplied thereto; and wherein
   a period of scanning one line of image comprises an effective reading period and an ineffective reading period, said controller comprises means for detecting at least an error during said ineffective reading period.

3. An image processing apparatus according to claim 2, wherein said error-detecting means includes means for measuring the period of said main scanning synchronizing signal.

4. An image processing apparatus according to claim 2, further comprising:
   an erasing unit for erasing image information carried on said sheet-like recording medium after said image is read therefrom;
   said controller comprising means for detecting an erasing level in said ineffective reading period.

5. An image processing apparatus according to claim 4, wherein said erasing-level detecting means includes means for holding a maximum value of the level of an image signal from a line to be read.

6. An image processing apparatus according to claim 2, wherein said controller comprises means for performing shading correction on the image to be read in at least an effective reading period, and wherein said shading-correction performing means comprises:
   means for convening an image signal representing the read image from analog image data into digital image data;
   means for reading shading corrective data in synchronism with a reference clock signal;
   means for adding said digital image data and said shading corrective data into combined data; and
   means for outputting the combined data.

7. An image processing apparatus according to claim 6, further comprising:
   a deflector for deflecting the laser beam to scan said sheet-like recording medium in the main scanning direction while the laser beam is being applied to said sheet-like recording medium, said deflector having a plurality of facets,
   said shading-correction performing means performing shading correction depending on facet characteristics of each of said facets of the deflector.

8. An image processing apparatus according to claim 2, wherein said controller comprises means for generating a signal to manage displaying of the image in synchronism with said main scanning synchronizing signal.

9. The image processing apparatus of claim 2, further comprising a second controller, said second controller dedicated for controlling the feeding of the sheet-like recording medium in reciprocating fashion.

10. The image processing apparatus of claim 9, further wherein the second controller further controls an erasing unit for erasing the sheet-like recording medium after said reading.

11. The image processing apparatus of claim 10, further wherein said controller dedicated for controlling reading of the image further supplies said second controller with corrective signals for said erasing unit, said corrective signals correlated in amplitude with a highest scanned phosphorescent response to said laser beam.

12. The image processing apparatus of claim 9, further wherein the second controller further controls a cassette loading unit for loading cassettes of said sheet-like recording medium.

13. The image processing apparatus of claim 2, further comprising a second controller performing at least one of feeding the sheet-like recording medium, loading the sheet-like recording medium, and erasing the sheet-like recording medium.

14. The image processing apparatus of claim 13, wherein said second controller interoperates with the controller for controlling reading.

15. The image processing apparatus of claim 14, wherein the second controller comprises a separate processor from the controller for controlling reading.

16. An image processing apparatus having an image reading unit for reading an image per line from a sheet-like recording medium by applying a laser beam to the sheet-like recording medium and scanning the sheet-like recording medium with the laser beam in a main scanning direction, comprising:
 a controller dedicated for controlling reading of the image from the sheet-like recording medium, said controller being operable in synchronism with a main scanning synchronizing signal supplied thereto, and wherein said controller comprises means for performing shading correction on the image to be read in at least an effective reading period, and further wherein said controller comprises means for detecting at least an error during at least an ineffective reading period; and wherein
 said shading-correction performing means comprises:
 means for converting an image signal representing the read image from analog image data into digital image data;
 means for reading shading corrective data in synchronism with a reference clock signal;
 means for adding said digital image data and said shading corrective data into combined data; and
 means for outputting the combined data.

17. An image processing apparatus according to claim 16, further comprising:
 a deflector for deflecting the laser beam to scan said sheet-like recording medium in the main scanning direction while the laser beam is being applied to said sheet-like recording medium, said deflector having a plurality of facets,
 said shading-correction performing means performing shading correction depending on facet characteristics of each of said facets of the deflector.

18. An image processing apparatus according to claim 16, wherein said controller comprises means for generating a signal to manage displaying of the image in synchronism with said main scanning synchronizing signal.

19. The image processing apparatus of claim 16, further comprising a second controller, said second controller dedicated for controlling the feeding of the sheet-like recording medium in reciprocating fashion.

20. The image processing apparatus of claim 19, further wherein the second controller further controls an erasing unit for erasing the sheet-like recording medium after said reading.

21. The image processing apparatus of claim 20, further wherein said controller dedicated for controlling reading of the image further supplies said second controller with corrective signals for said erasing unit, said corrective signals correlated in amplitude with a highest scanned phosphorescent response to said laser beam.

22. The image processing apparatus of claim 19, further wherein the second controller further controls a cassette loading unit for loading cassettes of said sheet-like recording medium.

23. The image processing apparatus of claim 16, further comprising a second controller performing at least one of feeding the sheet-like recording medium, loading the sheet-like recording medium, and erasing the sheet-like recording medium.

24. The image processing apparatus of claim 23, wherein said second controller interoperates with the controller for controlling reading.

25. The image processing apparatus of claim 24, wherein the second controller comprises a separate processor from the controller for controlling reading.

26. An image processing apparatus having an image reading unit for reading an image per line from a sheet-like recording medium by applying a laser beam to the sheet-like recording medium and scanning the sheet-like recording medium with the laser beam in a main scanning direction, comprising:
 a first controller dedicated for controlling reading of the image from the sheet-like recording medium, said first controller being operable in synchronism with a main scanning synchronizing signal supplied thereto, and wherein said first controller comprises means for performing shading correction on the image to be read in at least an effective reading period, and further wherein said first controller comprises means for detecting at least an error during at least an ineffective reading period;
 a deflector for deflecting the laser beam to scan said sheet-like recording medium in the main scanning direction while the laser beam is being applied to said sheet-like recording medium, said deflector having a plurality of facets, and
 said shading-correction performing means performing shading correction depending on facet characteristics of each of said facets of the deflector.

27. An image processing apparatus having an image reading unit for reading an image per line from a sheet-like recording medium by applying a laser beam to the sheet-like recording medium and scanning the sheet-like recording medium with the laser beam in a main scanning direction, comprising:
 a first controller dedicated for controlling reading of the image from the sheet-like recording medium, said first controller being operable in synchronism with a main scanning synchronizing signal supplied thereto, and wherein said first controller comprises means for performing shading correction on the image to be read in at least an effective reading period, and further wherein said first controller comprises means for detecting at least an error during at least an ineffective reading period; and
 a second controller, said second controller dedicated for controlling the feeding of the sheet-like recording medium in reciprocating fashion.

28. The image processing apparatus of claim 27, further wherein the second controller further controls a cassette loading unit for loading cassettes of said sheet-like recording medium.

29. An image processing apparatus having an image reading unit for reading an image per line from a sheet-like recording medium by applying a laser beam to the sheet-like recording medium and scanning the sheet-like recording medium with the laser beam in a main scanning direction, comprising:
 a first controller dedicated for controlling reading of the image from the sheet-like recording medium, said first controller being operable in synchronism with a main scanning synchronizing signal supplied thereto, and wherein said first controller comprises means for performing shading correction on the image to be read in at least an effective reading period, and further wherein said first controller comprises means for detecting at least an error during at least an ineffective reading period; and
 a second controller; wherein
 said first controller supplies said second controller with corrective signals for an erasing unit, said corrective signals correlated in amplitude with a highest scanned phosphorescent response to said laser beam.

30. The image processing apparatus of claim 29, further wherein said second controller further controls a cassette loading unit for loading cassettes of said sheet-like recording medium.

31. The image processing apparatus of claim 29, further wherein said second controller performs at least one of feeding the sheet-like recording medium, loading the sheet-like recording medium, and erasing the sheet-like recording medium.

32. The image processing apparatus of claim 31, wherein said second controller interoperates with said first controller.

33. The image processing apparatus of claim 32, wherein the second controller comprises a separate processor from the first controller.

34. An image processing apparatus having an image reading unit for reading an image per line from a sheet-like recording medium by applying a laser beam to the sheet-like recording medium and scanning the sheet-like recording medium with the laser beam in a main scanning direction, comprising:

a first controller dedicated for controlling reading of the image from the sheet-like recording medium, said first controller being operable in synchronism with a main scanning synchronizing signal supplied thereto, and wherein said first controller comprises means for performing shading correction on the image to be read in at least an effective reading period, and further wherein said first controller comprises means for detecting at least an error during at least an ineffective reading period; and a second controller, said second controller performing at least one of feeding the sheet-like recording medium, loading the sheet-like recording medium, and erasing the sheet-like recording medium.

35. The image processing apparatus of claim 34, wherein said second controller interoperates with said first controller.

36. The image processing apparatus of claim 35, wherein the second controller comprises a separate processor from the first controller.

* * * * *